United States Patent [19]

Miller et al.

[11] Patent Number: 5,481,104
[45] Date of Patent: Jan. 2, 1996

[54] PHOTODETECTOR CIRCUIT WITH ACTIVELY DAMPED TUNED INPUT

[75] Inventors: Gabriel L. Miller, Westfield; Eric R. Wagner, South Plainfield, both of N.J.

[73] Assignee: AT&T Corp., Murray Hill, N.J.

[21] Appl. No.: 316,587

[22] Filed: Sep. 30, 1994

[51] Int. Cl.⁶ ..................................................... H01J 40/14
[52] U.S. Cl. ................................ 250/214 C; 250/214 B; 359/189
[58] Field of Search ........................ 250/214 C, 214 R, 250/214 B, 551; 327/514; 359/154, 144, 161, 189; 330/308

[56] References Cited

U.S. PATENT DOCUMENTS

| | | | |
|---|---|---|---|
| 4,241,456 | 12/1980 | Nakagaki et al. | 359/189 |
| 4,751,745 | 6/1988 | Price | 359/189 |
| 5,029,240 | 7/1991 | de La Chapelle et al. | 359/189 |
| 5,142,401 | 8/1992 | Shen et al. | 359/189 |
| 5,296,697 | 3/1994 | Moses, Jr. | 250/214 B |
| 5,343,034 | 8/1994 | Sato | 250/214 C |
| 5,371,354 | 12/1994 | Domon et al. | 359/189 |

OTHER PUBLICATIONS

"Signal, Noise and Resolution In Position–Sensitive Detectors", IEEE Trans. Nuc. Sci. NS–21, No. 1, V. Radeka, Feb. 1974.

*Primary Examiner*—Edward P. Westin
*Assistant Examiner*—Steven L. Nichols

[57] ABSTRACT

A photodetector circuit is disclosed which can extract a carrier frequency signal from an optical beam. A photodiode is back-biased by a voltage supply, and the capacitance of the photodiode is dependent on the value of its back-bias potential. The photodiode is connected in parallel resonance with an inductor, and the parallel resonant combination is connected to the input of an inverting amplifier having a feedback capacitor. This feedback capacitor causes a capacitive component to appear in the input impedance of the amplifier which combines with the photodiode capacitance and the inductor to provide a parallel resonant tank circuit. The amplifier has a change in gain versus change in power supply characteristic. By selecting the value of the feedback capacitor, changes in the capacitive component of the input impedance are equal and opposite to changes in the capacitance of the photodiode, and the resonant frequency of the tank circuit is thereby essentially unaffected by changes in the supply voltage. A resistive element is added to the feedback impedance in order to lower the Q of the tank circuit to accommodate input signals having broader bandwidth. A frequency selective amplifying stage is added after the amplifier to help remove much lower frequency optical interference that is passed by the amplifier due to the broader bandwidth.

10 Claims, 1 Drawing Sheet

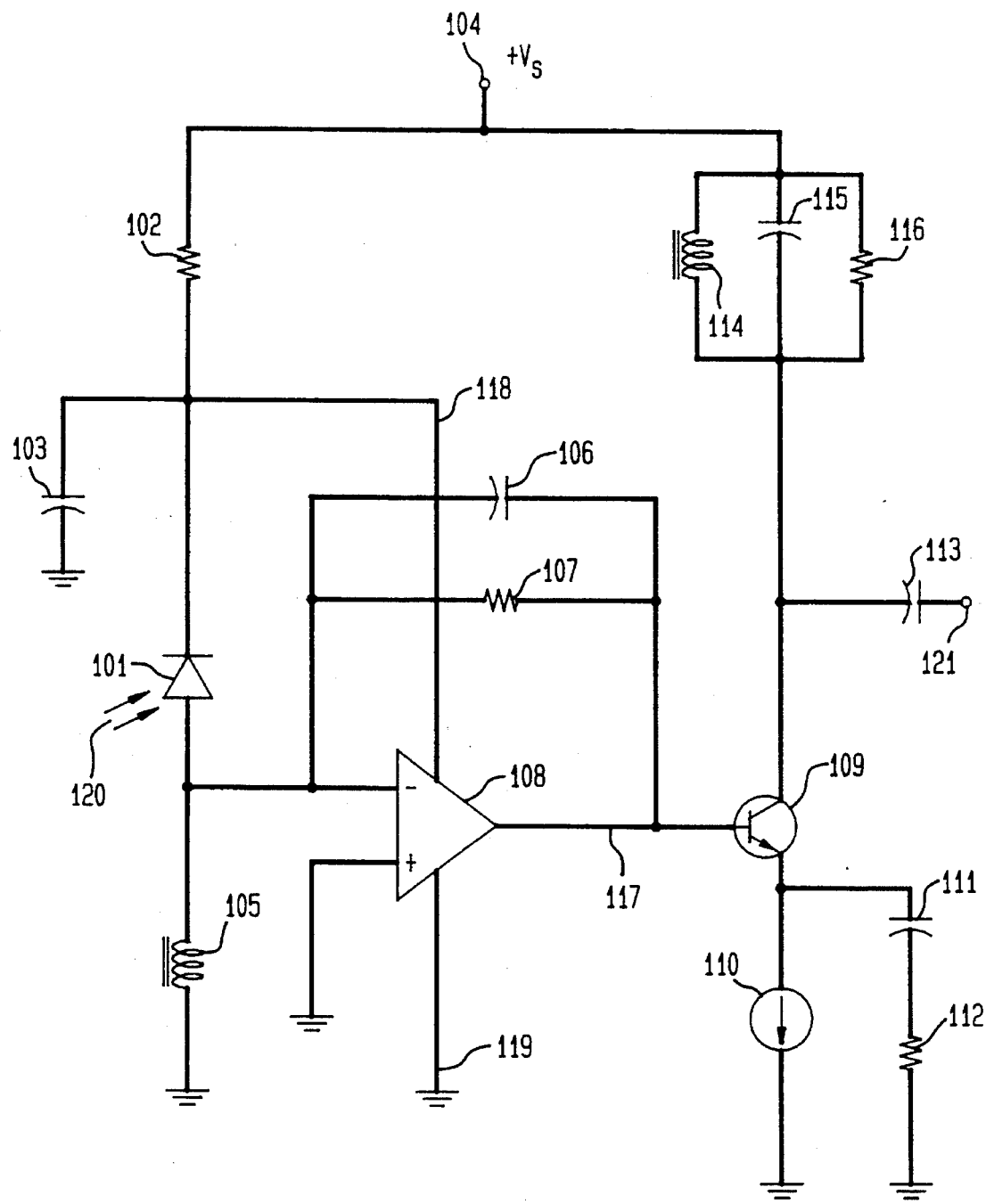

PHOTODETECTOR CIRCUIT WITH ACTIVELY DAMPED TUNED INPUT

FIELD OF THE INVENTION

This invention relates to input circuits for use with photodiodes and more particularly to input circuits which resonate the photodiode capacitance with an inductor in order to improve the signal to noise ratio and to eliminate the detrimental influence of background optical noise and interference.

DESCRIPTION OF THE RELATED ART

Hand-held infrared (IR) apparatus has become popular for many types of communications applications. Such apparatus is frequently used in environments where the background optical noise and interference can be much larger in magnitude than the desired signal. Fluorescent lighting, for example, can exhibit intense amplitude modulation at twice the line frequency and can have a rich harmonic content at multiples of 120 Hz. typically extending out to several kilohertz. Superimposed on top of the basic AC line frequency there may be much higher frequency optical components arising from switching transients and voltage spikes on the AC power line originating in high speed, high power, switching power supplies and motor controllers that are connected to the AC line and thereby to fluorescent lighting. This high speed optical structure is essentially all gone by about 200 KHz. The optical noise and interference arising from computer monitors and TV sets, however, extend out past 500 KHz. For these reasons it is not desirable to operate an IR link by directly modulating the IR optical source with the desired data to be transmitted. Instead it is preferable to 100% amplitude modulate the IR optical source at a high frequency (about 1 MHz. in the embodiment to be described herein after), thereby forming an optical carrier, and then in turn to modulate this optical carrier with the desired signal information.

The IR signal is usually detected by using one or several photodiodes. In order to maximize the signal to noise ratio while simultaneously minimizing the effect of low frequency interfering optical sources, it would in principle appear advantageous to resonate the capacitance of the photodiode detector with an inductor. However, one serious problem with this apparently simple approach is that these IR devices are frequently hand-held and are powered by batteries, while the battery voltage itself changes with time due to aging and discharge with use. As a result, the reverse bias voltage applied to the photodiode detector changes thereby changing its capacitance and correspondingly detuning the input tank LC circuit. Although the use of a Zener diode, or other stabilizing means, to control the voltage that is applied to the photodiode is a theoretical possibility, this would be more complex and a wasteful use of power in hand held apparatus that is to be used over extended periods of time.

In addition to the detuning issue there is a second potentially equally serious problem with the apparently advantageous scheme of simply resonating the photodiode capacitance with an inductor to form an input LC tuned circuit. this arises from the fact that such an input-tuned circuit is automatically narrow banded by the Q factor of the tank (where Q is defined as the tank resonant frequency divided by its half amplitude response bandwidth). As a result an IR link using the proposed scheme would apparently in principle be limited to low data rates, corresponding to its input-tank bandwidth.

SUMMARY OF THE INVENTION

The problem of providing an input circuit with high signal to noise ratio for an infrared receiver using a photodiode detector that is also immune to changes in the battery voltage, is solved by the present invention wherein a photodiode is in parallel with an inductor to form a resonant tank circuit at a carrier frequency. The signal across this tank circuit is coupled to an inverting amplifier having a specially chosen feedback capacitor. The value of the feedback capacitor is chosen from the gain versus voltage characteristics of the inverting amplifier in such a way as to compensate for changes that result from changing capacitance of the photodiode detector.

It is an additional inherent aspect of the present invention that an input signal having a broader bandwidth can be accommodated by lowering the Q of the resonant tank circuit through the use of a resistor of a specially chosen value connected in parallel with the feedback capacitor. It is the resistive part of the input impedance of the inverting amplifier which serves to lower the Q, by active damping, and it does so in such a way as to introduce very much less Johnson noise (typically by a factor of 3 or more) than would be the case of obtaining the same damping by physically connecting an actual resistor across the resonant tank. This therefore corresponds to broad-banding an LC tank without paying the corresponding noise penalty that would be occasioned by the use of a passive damping resistor.

If the tank must be broad-banded (for data rate improvement) to the point where the system is susceptible to lower frequency optical interference, additional filtering may be added in accordance with the present invention following the inverting amplifier that produces the combined effect of damping and capacitance cancellation.

BRIEF DESCRIPTION OF THE DRAWING

FIG. 1 is a schematic diagram of a circuit constructed in accordance with the present invention.

DESCRIPTION OF THE PREFERRED EMBODIMENT

In FIG. 1 an input infrared light beam 120, having a carrier which has been modulated with information to be detected, is caused to impinge on a photodiode 101. Although photodiode 101 is shown as a single diode, it can if desired be composed of a plurality of photodiodes connected in parallel in order to maximize the amount of photo current generated by the light beam and to accommodate the reception of light from various angles and distances. In the embodiment which was constructed, for example, eight Siemens type BPW34FA photodiodes were connected in parallel, yielding a total light receiving area of 0.56 cm$^2$ and an operating capacitance of about 170 pf. with the back-bias potential provided. Optical filters that pass infrared (IR) and attenuate visible light are built in to the BPW34FA photodiodes that were used. This tends to ameliorate the problem of lower frequency optical interference from fluorescent lights. However the amplifier circuitry following the photodiodes, even with the filters, still has to handle from tens, up to as much as hundreds, of microamperes of sometimes strongly modulated DC leakage current due to the background light. This background photo current is typically hundreds to many thousands of times larger than the actual signal current of interest.

An attractive way to solve the problem of background current is to simply resonate the photodiode capacitance with a suitable inductor to form a tank circuit at the optical carrier frequency (1 MHz. in the embodiment constructed). This approach automatically in effect throws away all of the unwanted modulated background light photocurrent, leaving only its shot noise contribution around the carrier frequency. However, there are two serious problems with this apparently attractive approach. As the battery voltage changes the photodiode capacitance also changes and this results in a change in the resonant frequency of the tank circuit, essentially detuning the receiver and reducing the amount of signal received. In addition, one would like to have the tank circuit have as high a Q as possible in order to have as high a signal to noise ratio as possible. If, however, the carrier is modulated in a way so as to generate wide sidebands, the Q of the tank circuit may have to be lowered in order to broaden the bandwidth of the input circuit. If one attempts to achieve this by simply connecting a resistor directly in parallel with the tank circuit, the reduction in signal to noise ratio (arising from the resistor Johnson noise) may be unacceptable.

In FIG. 1, the biasing voltage for photodiode 101 is supplied from a positive potential source 104, $V_S$, through a resistor 102 to the cathode of photodiode 101. A capacitor 103 is connected between the cathode of the photodiode and ground potential to provide a low-pass filtering action with resistor 102 which attenuates any unwanted noise components that may be present on power supply terminal 104. The anode of photodiode 101 is connected through inductor 105 to ground potential. Since capacitor 103 provides a low impedance at the carrier frequency, photodiode 101 and inductor 105 are essentially connected in parallel to form a parallel resonant circuit at the carrier frequency.

The signal at the carrier frequency, bearing the modulated data of interest, is coupled from the junction of photodiode 101 and inductor 105 to the input of an inverting amplifier 108. The power input to amplifier 108 is connected by way of line 118 to receive the filtered potential available at the cathode of photodiode 101, and line 119 completes the power connection to ground for amplifier 108. The output of amplifier 108 on line 117 is connected both to one terminal of a feedback capacitor 106 and to one terminal of a feedback resistor 107. The other terminals of capacitor 106 and resistor 107 are connected to the inverting input of amplifier 108 to form a negative feedback arrangement. In the embodiment which was constructed, amplifier 108 was implemented with an inverted cascode amplifier having a gain of 40 by using a Motorola MPSA18 NPN transistor input stage. This amplifier exhibited an input series noise spectral density of 3.5 nV/(Hz.)$^{1/2}$ and negligible phase shift at the operating frequency of 1 MHz. As a result of the feedback arrangement capacitor 106 and resistor 107, respectively, cause the generation of an input impedance having capacitive and resistive components across a resonant tank circuit including photodiode 101 and inductor 105. The capacitive component influences the resonant frequency of the tank circuit, and inductor 105 is preferably an adjustable inductor which can be changed to provide the correct tank resonant frequency. The resistive component of the amplifier effective input impedance advantageously reduces the Q in a manner to be described herein after.

For abrupt p-n junctions, of the type most often used for photodiodes, the depletion layer thickness is essentially proportional to the square root of the total reverse bias voltage $V_b$. Accordingly the photodiode capacitance $C_d$ is proportional to the reciprocal of the battery voltage:

$$C_d \propto \frac{1}{\sqrt{V_b}}$$

As a result, the relationship between small changes in the photodiode capacitance and changes in the battery voltage can be expressed as follows:

$$\frac{\Delta C_d}{C_d} = -\frac{\Delta V_b}{2V_b}$$

The capacitive component of the input impedance is equal to (G+1) times the feedback capacitor $C_f$. Since the gain G is much greater than 1, the capacitive component of the input impedance can be approximated as ($GC_f$). Since the capacitance of the photodiode and the capacitive component of the input impedance are in parallel, one would like any change in the photodiode capacitance to be compensated for by a corresponding negative change in the capacitive component of the input impedance:

$$\Delta C_d = -C_f \Delta G$$

Solving the latter equation for $C_f$ and substituting for the value of $\Delta C_d$ from the above equation, the following relationship must be satisfied in order to obtain the desired compensation:

$$C_f = \frac{C_d}{2V_b} \cdot \frac{1}{(\Delta G/\Delta V_b)}$$

For the inverted cascode amplifier of the type used in the construction of the present embodiment, the gain G is proportional to $(V_b - V_o)$, where $V_o$ is a constant voltage of about 1 volt representing the collector voltage of the MPSA18 input stage. Accordingly, for an inverted cascode amplifier of the type used in the embodiment which was constructed, the change in gain versus change in battery voltage can be expressed by the following equation:

$$\frac{\Delta G}{\Delta V_b} = \frac{G}{V_b - V_o}$$

Substituting the latter equation into the above equation for $C_f$, the following equation for an inverted cascode amplifier is obtained:

$$C_f = \frac{C_d}{2G} \cdot \frac{(V_b - V_o)}{V_b}$$

In the embodiment which was constructed where $C_d$ was equal to 170 pf., G was about 40, the battery voltage was about 5 volts, and $V_o$ was about 1 volt, the value for $C_f$ was 1.7 pf. With this value of feedback capacitor, changes in the photodiode capacitance due to changes in the battery voltage are automatically cancelled by changes in the capacitive component of the input impedance, and the tank circuit resonant frequency becomes essentially independent of battery voltage. For the system constructed the shift in the input tank resonant frequency was found to be negligible over the desired range of supply voltages of 4 to 6 volts.

As pointed out herein above, the processing of an input carrier signal which requires a wide bandwidth may require that the bandwidth of the input tank circuit be broadened by damping the tank circuit. Feedback resistor 107 provides a resistive component to the input impedance of amplifier 108 which in turn provides this damping, and it does so in a way that does not result in the introduction of as large an amount of Johnson noise as would be the case if the tank circuit were simply damped by a parallel resistor. (A theoretical discussion of the advantages of using a feedback resistor to damp an input circuit can be found in the article entitled "Signal, Noise and Resolution in Position-Sensitive Detectors", by V. Radeka, IEEE trans. Nuc. Sci. NS-21, No. 1, February, 1974.)

In the present embodiment which was constructed, a feedback resistor of 120K Ohms and an amplifier gain of 40 resulted in a resistive portion of the input impedance of 3000 Ohms. This 3K Ohms of damping results in an advantageously low Q of only 5 for the input tank used, and computer analysis confirmed that the noise performance was three times better than that possible by the use of passive damping. The resulting over all receiver noise was negligible compared to the noise due to the many microamperes of photocurrent typically arising from background light.

Since the input tank bandwidth is quite large in the embodiment which was constructed, the receiver still had a significant gain at lower frequencies where large quantities of modulating interfering signals can still exist. Accordingly, the output of amplifier 108 is connected by way of line 117 to the base of a common emitter stage using NPN transistor 109. This stage of amplification using transistor 109 has two additional methods of interference filtering.

The base of transistor 109 is connected to a constant current sink 110 to bias the transistor. Also connected from the emitter of transistor 109 to ground potential is a series circuit consisting of capacitor 111 and resistor 220. The value of capacitor 111 is chosen such that it presents a significant impedance at low frequencies but is insignificant relative to the value of resistor 220 at the carrier frequency. Accordingly, the gain provided by transistor 109 at frequencies lower than the carrier frequency is considerably reduced.

In addition, the collector of transistor 109 is connected to a parallel resonant circuit consisting of inductor 114 and capacitor 115, the other end of which is connected to the positive potential source 104. This parallel resonant circuit is chosen to resonate at the carrier frequency and is damped by the action of resistor 116 which is connected in parallel with the resonant circuit in order to maintain the proper bandwidth.

Finally, a capacitor 113 couples the signal at the carrier frequency to an output terminal which can be connected to further stages of amplification, followed by appropriate demodulation, using standard techniques that are well known in the radio receiver and data communications arts. In particular it is noteworthy that the resonant, capacity cancelling, actively damped IR receiver approach that is described herein is advantageously compatible with all three of the standard modulation techniques, namely frequency shift keying (FSK), phase shift keying (PSK), and amplitude shift keying (ASK). In particular if FSK is used (as was in the case of the present system) the receiver of FIG. 1 can be used to drive a standard low-cost FM radio receiver chip such as the Motorola MC3359. This chip incorporates a standard quadrature demodulator which can be used to recover the signal information. An even better approach is to use the demodulator described in my copending patent application entitled, "Phase Locked Quadrature Demodulator".

What has been described herein is an illustrate embodiment of the present invention. Numerous departures may be made by those skilled in the art without departing from the spirit and scope of the present invention. For example, an inverting amplifier configuration other than the cascode can be used to provide compensation for the change in capacitance of the photodiode. One simply has to analyze the amplifier to determine its change in gain versus change in battery voltage characteristic and use that relationship in the above-identified equation to obtain the required value of the feedback capacitor.

What is claimed is:

1. A photodetector circuit for use in extracting an output signal from a modulated optical carrier of frequency $f_O$, said circuit to be connected to a voltage supply $V_b$ which is subject to a change $\Delta V_b$ in voltage, said circuit comprising a photodetector diode having a capacitance of $C_d$ at the nominal voltage of $V_b$, an inductor, means for connecting said photodetector diode and said inductor such that said photodetector diode and said inductor are in parallel at said frequency $f_O$ and said photodetector diode is back-biased by said voltage supply, the capacitance of said photodetector diode being subject to change with changes in the voltage from said voltage supply, and an inverting amplifier having an input and an output and a change in gain $\Delta G$ which depends on said change $\Delta V_b$, means for connecting the input of said amplifier to the parallel resonant combination of said photodetector diode and said inductor, characterized in that said circuit further includes an impedance connected between the input and output of said amplifier, said impedance having a capacitive element $C_f$ which provides a capacitive component to the input impedance of said inverting amplifier, thereby resulting in a parallel resonant tank circuit consisting of the photodetector diode, the inductance, and said capacitive component.

2. A photodetector circuit as defined in claim 1 wherein said capacitive element $C_f$ substantially satisfies the following equation:

$$C_f = \frac{C_d}{2V_b} \frac{1}{(\Delta G/\Delta V_b)}.$$

3. A photodetector circuit as defined in claim 1 wherein said inverting amplifier is an inverted cascode amplifier whose gain G is proportional to $(V_b-V_o)$ where $V_o$ is a constant voltage of about 1 volt, and said impedance capacitive element $C_f$ substantially satisfies the following equation:

$$C_f = \frac{C_d}{2G} \frac{(V_b - V_o)}{V_b}.$$

4. A photodetector circuit as defined in claim 1, 2, or 3 wherein said impedance also includes a resistive element, said resistive element resulting in a resistive component to the input impedance of said inverting amplifier, said resistive component resulting in a lower Q of said parallel resonant tank circuit.

5. A photodetector circuit for use in extracting an output signal from a modulated optical input of carrier frequency $f_O$, said circuit to be connected to a voltage supply $V_s$ which is subject to a change in voltage, said circuit comprising a photodetector diode, an inductor connected in series with said photodetector diode, low-pass filtering means for connecting said voltage supply to the series combination of said photodetector diode and said inductor such that said photodetector diode is back-biased by a voltage of $V_b$ from said voltage supply, the capacitance of said photodetector diode being subject to change with changes in voltage from said voltage supply, and an inverting amplifier having an input and an output and powered by said voltage $V_b$, said amplifier having a change in gain $\Delta G$ which depends on a change in voltage supply $\Delta V_b$, means for connecting the input of said amplifier to the junction of said photodetector diode and said inductor, characterized in that said circuit further includes an impedance connected between the input and output of said amplifier, said impedance having a capacitive element $C_f$ which provides a capacitive component to the input impedance of said inverting amplifier, thereby resulting in a parallel resonant tank circuit consisting of the photodetector diode, the inductance, and said capacitive component.

6. A photodetector circuit as defined in claim 5 wherein said impedance also includes a resistive element, said resistive element resulting in a resistive component to the input impedance of said inverting amplifier, said resistive component resulting in a lower Q for said parallel resonant tank circuit, whereby said resistive component provides low noise damping.

7. A photodetector circuit as defined in claim 6 wherein said circuit further includes an NPN transistor having a base, emitter and collector electrode, said NPN transistor being connected in a common emitter arrangement with its base connected to the output of said inverting amplifier, a high impedance current sink connected between said emitter electrode and ground potential, a series circuit consisting of a capacitor and resistor connected between said emitter electrode and ground potential, and a collector impedance connected between said collector electrode and said voltage supply, whereby said output signal is available from said collector electrode.

8. A photodetector circuit as defined in claim 7 wherein said collector impedance includes a damped parallel resonant circuit having a resonant frequency substantially equal to $f_o$.

9. A photodetector circuit as defined in claim 8 wherein said capacitive element $C_f$ substantially satisfies the following equation:

$$C_f = \frac{C_d}{2V_b} \frac{1}{(\Delta G/\Delta V_b)}.$$

10. A photodetector circuit as defined in claim 8 wherein said inverting amplifier is an inverted cascode amplifier whose gain G is proportional to $(V_b - V_o)$ where $V_o$ is a constant voltage of about 1 volt, and said impedance capacitive element $C_f$ substantially satisfies the following equation:

$$C_f = \frac{C_d}{2G} \frac{(V_b - V_o)}{V_b}.$$

* * * * *